United States Patent [19]
Suzuki et al.

[11] Patent Number: 5,888,656
[45] Date of Patent: Mar. 30, 1999

[54] CURED SILICONE RUBBER ARTICLE HAVING A PROTECTIVE COATING LAYER

[75] Inventors: Norio Suzuki; Toshihiro Nakata, both of Nagano-ken, Japan

[73] Assignee: Shin-Etsu Polymer Co., Ltd., Tokyo, Japan

[21] Appl. No.: 600,804

[22] Filed: Feb. 13, 1996

[30] Foreign Application Priority Data

Mar. 15, 1995 [JP] Japan .................................... 7-055441

[51] Int. Cl.⁶ .................................................... B32B 25/20
[52] U.S. Cl. .................. 428/425.5; 427/322; 427/393.5; 427/534; 427/536; 200/333
[58] Field of Search ........................ 428/425.5; 427/322, 427/393.5, 534, 536; 200/333

[56] References Cited

U.S. PATENT DOCUMENTS

| | | | |
|---|---|---|---|
| 3,837,876 | 9/1974 | Mayuzumi et al. | 106/287 SB |
| 4,312,693 | 1/1982 | Salensky et al. | 156/272 |
| 4,401,500 | 8/1983 | Hamada et al. | 156/307.5 |
| 4,868,096 | 9/1989 | Nakayama et al. | 430/329 |
| 5,192,603 | 3/1993 | Slater et al. | 428/217 |
| 5,290,601 | 3/1994 | Brooks et al. | 427/412.4 |
| 5,294,487 | 3/1994 | Ohashi et al. | 428/308.4 |
| 5,344,462 | 9/1994 | Paskalov et al. | 8/115.52 |
| 5,439,545 | 8/1995 | Nakanishi et al. | 156/273.3 |
| 5,468,560 | 11/1995 | McPherson et al. | 428/413 |
| 5,804,299 | 9/1998 | Nakata et al. | 428/334 |

*Primary Examiner*—Margaret W. Glass
*Attorney, Agent, or Firm*—McAulay Nissen; Goldberg Kiel & Hand, LLP

[57] ABSTRACT

Proposed is a cured silicone rubber article such as a push button switch covering member having a protective coating layer of a urethane resin-based coating composition having excellent wear resistance against rubbing and capable of giving a dry and rigid touch feeling to the finger tip of the operator of the key tops. The coated silicone rubber article is obtained by subjecting a cured base body of a silicone rubber, prior to the coating with a urethane resin-based coating composition, first to a low temperature plasma treatment and then to a coating treatment with a specific primer composition which is a mixture of an epoxy group-containing organosilane compound and an amino group-containing organosilane compound in a molar mixing ratio in the range from 1:2 to 1:5.

12 Claims, 3 Drawing Sheets

CURED SILICONE RUBBER ARTICLE HAVING A PROTECTIVE COATING LAYER

BACKGROUND OF THE INVENTION

The present invention relates to a cured silicone rubber article having a protective coating layer of a urethane resin-based coating composition or, more particularly, to a cured silicone rubber article, of which the surface layer is of the silicone rubber as such or a silicone resin-based coating layer, having a protective coating layer of a urethane resin-based coating composition with very firm adhesive bonding to the substrate surface to be resistive against abrasive rubbing as well as to a method for the preparation of such an article. In particular, the invention is applicable to a silicone rubber-made push button switch covering member of which the key top surface bearing an indicia to indicate the function of the particular key top which should be highly resistant against wearing under repeated pushing operations with a finger tip.

As is well known, various kinds of modern electric and electronic instruments, such as telephones, pocketable calculators, office-automation instruments, computers and the like, have a push button switch panel containing a plurality of push button switches. Sometimes, such a push button switches are desired to be visible or recognizable even in a dark place as in various kinds of instruments born on a transportation machine such as air crafts, automobiles, boats and the like by proving an internal illuminating means.

A push button switch panel currently under practical applications basically consists of a base board, on which a plurality of pairs of fixed contact points are provided, and a push button switch covering member made from a rubbery material having elasticity and having a plurality of push button units corresponding to the pairs of fixed contact points on the base board on which the push button switch covering member is mounted. A single push button unit in the push button switch covering member consists, in principle, of a base plate, a key top plate and a riser part connecting the base plate and the key top plate to form a dome-like protrusion on the base plate. It is usual that the key top plate is provided on the upper surface with an indicia to indicate the function of the particular switch while the key top plate is provided on the lower surface with a movable contact point which comes into contact with the fixed contact points on the base board either directly or indirectly through a click plate and the like when the key top plate is pushed down with a finger tip of the operator so as to close the electric circuit. When the key top plate is released from the pushing-down force, it regains the undepressed disposition by means of the elastic resilience of the riser part to open the electric circuit.

By virtue of the simple structure requiring a small number of parts and easiness of assemblage as compared with traditional mechanical switches, the push button switch panels of the above described type are widely used in various fields mentioned above. Among various kinds of rubbery materials, silicone rubbers are the most widely used rubbery materials for the push button switch covering member, which is an integral body prepared by molding and curing a silicone rubber, in respects of the unique and advantageous properties thereof such as the precision moldability, excellent electric insulation, high heat and cold resistance, weatherability, resistance against fatigue by repeated bending, elastic resilience and so on.

Conventional silicone rubber-made push button switch covering members, however, have several problems and disadvantages that, as an inherency of silicone rubbers, the top surface of the key top plate gives a feeling of tackiness to the operator's finger tips to disturb smooth key operation resulting in a decrease in the operating efficiency, that no high resistance can be obtained against wearing of the indicia provided on the upper surface of the key top plate and that the greasy material excreted from the finger tip of the operator permeates the silicone rubber layer of the key top plate to reach and infiltrate the movable contact point resulting in an increase in the electric resistivity thereof. Several remedial means described below are heretofore undertaken to solve these problems.

Firstly, the top surface of the key top plate of a push button switch covering member provided with an indicia is coated with a silicone resin-based coating composition as is disclosed in Japanese Patent Kokai 62-268025. Secondly, the top surface of the key top plate of a push button switch covering member provided with an indicia is first subjected to a treatment with corona discharge followed by application of an amino silane-based coupling agent as a primer and coating with a urethane resin-based coating composition.

The above mentioned first way is in fact effective in imparting the upper surface of the key top with a rigid and dry touch feeling to the operator's finger tip but almost no improvement can be obtained thereby in respect of the wearing resistance of the indicia by the repetition of key-pushing operations. The second way mentioned above is also effective in imparting the upper surface of the key top with a rigid and dry touch feeling to the operator's finger tip and, in addition, is also effective in the improvement of the wearing resistance of the indicia and prevention of infiltration of a greasy material through the key top plate to reach the movable contact point below the key top plate but a problem left in this way is that the coating layer of the urethane resin-based coating composition is susceptible to yellowing in the lapse of time.

SUMMARY OF THE INVENTION

The present invention accordingly has an object to provide a cured silicone rubber article or, in particular, a silicone rubber-made push button switch covering member having a protective coating layer which is free from the above described problems and disadvantages in the surface-coated silicone rubber articles in the prior art as well as a method for the preparation thereof.

Thus, the cured silicone rubber article having a protective coating layer provided by the invention comprises:

(a) a substrate of which the surface layer is formed from a cured silicone rubber or silicone resin having a surface after a treatment with low temperature plasma;

(b) an intermediate layer on the plasma-treated surface of the substrate formed from a primer composition which is a blend of an epoxy group-containing organosilane compound and an amino group-containing organosilane compound in a molar proportion in the range from 1:2 to 1:5; and (c) a top layer of a cured urethane resin-based coating composition on the layer of the primer composition.

The above defined cured silicone rubber article having a protective coating layer is prepared in a process which comprises the steps of:

(1) subjecting a cured body of a silicone rubber to a treatment with low temperature plasma, of which the surface layer is made from the silicone rubber or a silicone resin;

(2) coating the plasma-treated surface of the silicone rubber article with a primer composition which is a blend of an epoxy group-containing organosilane compound and an amino group-containing organosilane compound in a molar proportion in the range from 1:2 to 1:5 to form an intermediate primer layer;

(3) coating the surface of the intermediate layer of the primer composition with a urethane resin-based coating composition consisting of a polyisocyanate compound and a polyol compound and containing 1 to 10% by weight of an dialkyl peroxide based on the total amount of the polyisocyanate compound and the polyol compound; and (4) heating the thus coated silicone rubber article to effect curing of the urethane resin-based coating composition.

Further, the silicone rubber-made push button switch covering member provided by the invention comprises:

(A) a base body of a cured silicone rubber, of which the surface layer is formed from a cured silicone rubber or silicone resin, having a configuration integrally consisting of
i) a base plate,
ii) at least one key top plate above the base plate, and
iii) at least one riser part connecting the base plate and the key top plate to form a dome-like protrusion rising on the base plate,
the surface of the base body being after a treatment with low temperature plasma;

(B) an intermediate layer on the surface of the key top plate formed from a primer composition which is a blend of an epoxy group-containing organosilane compound and an amino group-containing organosilane compound in a molar proportion in the range from 1:2 to 1:5; and (C) a top layer of a cured urethane resin-based coating composition on the intermediate layer of the primer composition.

DETAILED DESCRIPTION OF THE PREFERRED EMBODIMENTS

The substrate or the base body of the coated rubber article or, in particular, the push button switch covering member of the present invention is preferably made from a silicone rubber in respects of the excellent precision-moldability, electric insulation, heat and cold resistance, elastic resilience and other properties. Various types of silicone rubber compositions available on the market can be used for the purpose without particular limitations although, when an internally illuminable model of the push button switch covering member is desired, the silicone rubber composition must be compounded with such a formulation that the light transmissivity, i.e. transparency or translucency, of the silicone rubber after curing be as high as possible. Though not particularly limitative, the silicone rubber composition after curing should preferably have a hardness in the range from 30 to 80 in the Shore A scale. Various commercial grades of silicone rubber compositions to satisfy this requirement are available on the market including KE 961U, KE 951U and KE 941U (each a product by Shin-Etsu Chemical Co.). Commercial grades of silicone rubber compositions usable when light transmissivity is essential include DY32-6014U (a product by Toray Dow Corning Co.), TSE260-3U (a product by Toshiba Silicone Co.), KE 951TU (a product by Shin-Etsu Chemical Co.) and the like. These silicone rubber compositions are, prior to molding and curing, compounded with an appropriate amount of a curing agent of the grade recommended by the respective producers of the silicone rubber compositions. If necessary, the silicone rubber composition can be compounded with a coloring agent or a light diffusing agent. The molding and curing method for the silicone rubber composition to prepare a base body of the inventive push button switch covering member is not particularly limitative but any conventional injection molding and compression molding methods are applicable.

The first step of the process for the preparation of the inventive coated rubber article or coated push button switch covering member is a treatment of the thus obtained silicone rubber substrate or base body of the covering member with low temperature plasma, which can optionally be preceded by a coating treatment of the silicone rubber surface with a silicone resin-based coating composition comprising an organopolysiloxane resin, a curing catalyst and, optionally, a coloring agent dissolved in an organic solvent. The silicone resin-based coating composition is applied to the rubber surface in a conventional coating method including the pad printing method and screen printing method when the coating composition is to be applied to the surface of the key top plate only and brush coating, spray coating and dip coating when the coating composition is to be applied to the whole surface of the push button switch covering member. The curing conditions of the silicone resin-based coating composition can be conventional according to the recommendation of the respective producers of the coating composition including the heating time of 15 to 60 minutes when the heating temperature is, for example, 200° C. in a hot air circulation oven or in an infrared lamp conveyer furnace.

The low temperature plasma treatment is undertaken with an object to decompose and remove any foreign materials on the surface and to activate the surface of the workpiece, i.e. the rubber article or base body of the covering member, optionally, having a coating layer of a silicone resin-based coating composition by the exposure of the rubber surface to an atmosphere containing active species such as free electrons, ions and free radicals generated in a low-pressure atmosphere by high-frequency electric discharge. Various kinds of gases can be used for the atmosphere of low temperature plasma including nitrogen, oxygen, helium, argon, carbon tetrafluoride, air and the like as well as mixtures thereof. When the low temperature plasma treatment of a workpiece is undertaken in such an atmosphere, the active species produced from these gaseous molecules interact with the surface to introduce polar groups thereto imparting adhesiveness and hydrophilicity. When the treatment is undertaken in an oxygen-containing atmosphere, a polymeric peroxide is formed on the surface of the workpiece which interacts with the primer composition applied to the plasma-treated rubber surface to improve adhesion of the coating layer to the substrate surface. In this regard, the gas forming the atmosphere of plasma is preferably oxygen or a mixture of oxygen and argon. The low temperature plasma treatment of the rubber surface is performed for a length of time in the range from 0.5 to 60 minutes. The desired improvement can hardly be obtained when the treatment time is too short as a matter of course while the treatment for a too long time may causes a disadvantage that degradation of the rubbery material proceeds eventually resulting in break of the thin-walled parts of the workpiece such as the riser part of the push button switch covering member to lose mechanical strengths required for withstanding repeated pushing operations.

The next step in the process for the preparation of the coated silicone rubber article or coated push button switch covering member of the invention is application of of a specific primer composition to the thus plasma-treated surface of the silicone rubber substrate or base body. This primer treatment is essential because the coating layer of a urethane resin-based coating composition hardly exhibits durable adhesion to the plasma treated silicone rubber surface. Different from conventional primer treatment, the primer composition used in the invention is a blend of two kinds of functional organosilane compounds including, one, an epoxy group-containing silane compound and, the other, an amino group-containing organosilane compound in a molar mixing proportion in the range from 1:2 to 1:5. The primer composition is applied to the rubber surface usually in the form of a solution in an organic solvent which is preferably an aromatic hydrocarbon compound having a molecular weight not exceeding 110 or, more preferably, in the range from 90 to 110 in respects of the safety and working efficiency. The concentration of the silane compounds in the solution is not particularly limitative but it is preferably in the range from 30% to 60% by weight in consideration of the working efficiency with the solution. The coating amount on the plasma-treated silicone rubber surface is preferably in the range from 1 to 50 g/m². It is of course optional that the solution of the organosilanes is admixed with a coloring agent such as dyes in order to increase visibility of the primer layer.

The above mentioned epoxy group-containing organosilane compound and the amino group-containing organosilane compound are represented by the general formulas and respectively, in which R is a methyl group or ethyl group, the subscripts m and n are each a number of 1, 2 or 3, A is a divalent hydrocarbon group, X is a monovalent organic group having an epoxy group and Y is a monovalent organic group having an amino group.

Examples of the epoxy group-containing organosilane compound include 2-(3,4-epoxycyclohexyl)ethyl trimethoxy silane, 3-glycidyloxypropyl trimethoxy silane, 3-glycidyloxypropyl methyl diethoxy silane, 3-glycidyloxypropyl triethoxy silane and the like and examples of the amino group-containing organosilane compound include N-(2-aminoethyl)-3-aminopropyl trimethoxy silane, N-(2-aminoethyl)-3-aminopropyl methyl dimethoxy silane, N-(2-aminoethyl)-3-aminopropyl triethoxy silane, 3-aminopropyl trimethoxy silane, 3-aminopropyl triethoxy silane and the like though not particularly limitative thereto.

Although these amino group-containing organosilanes are well known as a silane coupling agent or a primer to improve the adhesion between the surface of a cured silicone rubber and an organic resin or rubber including a urethane resin-based coating composition (see, for example, Japanese Patent Kokai 4-96942), a problem in the use of the amino group-containing organosilane compound alone as a primer is that the primer layer is subject to yellowing or denaturation with appearance of brittleness resulting in a decrease in the adhesion between the substrate silicone rubber surface and the urethane resin-based coating layer, especially, under prolonged exposure to a high temperature of, for example, 85° C. or higher. Accordingly, it is a novel and quite unique discovery that the disadvantages in the use of an amino group-containing organosilane compound as a primer can be dissolved when the amino group-containing organosilane compound is combined with an epoxy group-containing organosilane compound in a specific blending proportion. It is preferable that the coating treatment with the primer composition is performed as soon as possible or not later than one hour after completion of the low temperature plasma treatment of the silicone rubber surface.

The next step to follow the primer treatment of the silicone rubber surface is coating with a urethane resin-based coating composition which is basically a blend of a polyol compound and a polyisocyanate compound with admixture of a curing catalyst. Examples of suitable polyol compounds include alkyd polyols, polyester polyols and acrylic polyols as well as epoxy-modified polyols, polyester-modified polyols and urethane-modified polyols thereof. Examples of suitable polyisocyanate compounds include tolylene-2,4-diisocyanate, tolylene-2,6-diisocyanate, 3,3'-bitolylene-4,4'-diisocyanate, diphenylmethane-4,4'-diisocyanate, 3,3'-dimethyldiphenylmethane-4,4'-diisocyanate, 1,3-phenylene diisocyanate, triphenylmethane triisocyanate, dimer of tolylene-2,4-diisocyanate, hexamethylene diisocyanate and naphthaline-1,5-diisocyanate.

The blending proportion of the polyisocyanate compound and the polyol compound or the so-called NCO/OH molar ratio in the coating composition should preferably be such that from 1.5 to 2.0 moles of the isocyanate groups NCO in the polyisocyanate compound are provided per mole of the hydroxy groups OH in the polyol compound. When the NCO/OH molar ratio is too low, the coating layer after curing of the coating composition cannot be imparted with a sufficiently high hardness without wearing resistance against abrasion while, when the NCO/OH molar ratio is too high, the coating layer after curing is too rigid with appearance of some brittleness.

It is essential that the urethane resin-based coating composition is admixed with from 1 to 10 parts by weight of a dialkyl peroxide as a curing agent per 100 parts by weight of the total amount of the polyol compound and the polyisocyanate compound. Addition of this curing agent has advantages that the coating layer of the coating composition after curing is imparted with improved tear strength and heat resistance and is prevented from occurrence of foaming and cracks by heating in addition to the improvement in the adhesion of the coating film to the underlying surface.

Examples of suitable dialkyl peroxides include di-tert-butyl peroxide, di-tert-amyl peroxide, 2,5-dimethyl-2,5-di (tert-butylperoxy) hexane, α,α'-bis(tert-butylperoxy) diisopropyl benzene, 1,1-bis(tert-butylperoxy)-3,3,5-trimethyl cyclohexane, 1,3-bis(tert-butylperoxyisopropyl) benzene, n-butyl 4,4-bis(tert-butylperoxy) valelate, 2,2-bis (4,4-di-tert-butylperoxycyclohexyl) propane, 2,2-bis(tert-butylperoxy) butane and 1,1-di(tert-butylperoxy) cyclohexane, of which 1,1-bis(tert-butylperoxy)-3,3,5-trimethyl cyclohexane, 1,3-bis(tert-butylperoxyisopropyl)

benzene and n-butyl 4,4-bis(tert-butylperoxy) valelate are preferred in respect of their less intense unpleasant odor not to cause a problem in the working environment. It is of course optional according to need to admix the urethane resin-based coating composition with a coloring agent such as dyes.

The coating layer of the urethane resin-based coating composition formulated as above can be fully cured by heating at a temperature in the range from 180° to 220° C. or, preferably, from 190° to 210° C. for 15 to 60 minutes depending on the particular formulation of the coating composition.

In the following, the present invention is described in more detail for the preparation of a silicone rubber-made push button switch covering member as a particular application of the invention by making reference to the accompanying drawing.

Figure 1A:
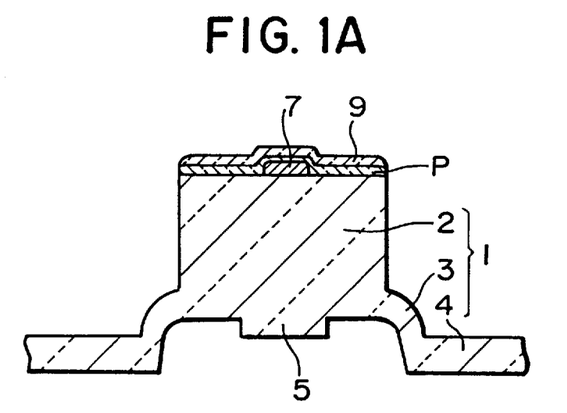
FIGS. 1A, 1B and 1C are each a schematic illustration of a vertical cross sectional view of a different embodiment of the inventive push button switch covering member.
Figure 1B:
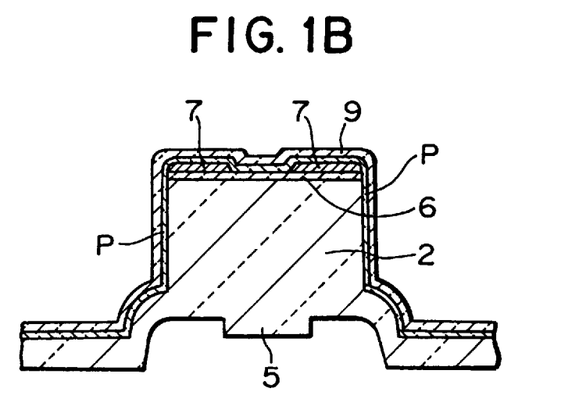
Figure 1C:
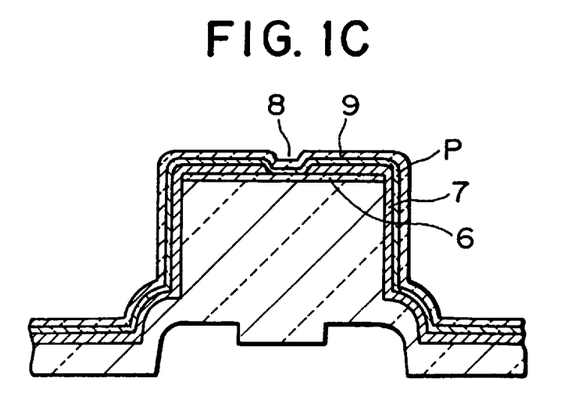

FIGS. 1A, 1B and 1C are each a vertical cross sectional view of a silicone rubber-made push button switch covering member showing a single push button unit with a base body 1 consisting of a base plate 4, a key top 2 and a riser part 3 connecting the base plate 4 and the key top 2 to form a dome-like raised part. The key top 2 is provided on the lower surface with a protrusion 5 which, when the key top 2 is pushed down with a finger tip, either directly or indirectly brings a movable contact point (not shown in the figures) into contact with a pair of fixed contact points on a base board (not shown in the figures) on which the covering member is mounted.

In the embodiment illustrated in FIG. 1A, the key top 2 of a silicone rubber is first provided with an indicia 7 of a letter, symbol mark or sign to indicate the particular function of this push button switch with a suitable marking agent such as a silicone resin-based coating composition having a color different from that of the key top per se. After curing of the silicone resin-based coating layer 7, the upper surface of the base body 1 including the surface of the indicia 7 is subjected to a low temperature plasma treatment to activate the silicone surface followed by a coating treatment with a primer composition to form a primer layer P on which a top coating 9 is provided with a urethane resin-based coating composition capable of giving a protective coating layer 9 having transparency in order not to decrease visibility of the indicia 7 therethrough. It is of course that coating with a urethane resin-based coating composition is not limited to the upper surface of the key top 2 only but the whole upper surface of the base body 1 is coated therewith including the side surface of the key top 2, riser part 3 and base plate 4 after formation of a primer layer P.

The embodiment illustrated in FIG. 1B is an internally illuminable push button switch covering member of which the base body 1 is shaped from a light-transmitting silicone rubber. The whole upper surface of the key top 2 is first coated with a light-transmitting colored silicone resin-based coating composition to form a layer 6 and then coated with a light-shielding silicone resin-based coating composition to form a light-shielding layer 7 leaving the area corresponding to an indicia. Thereafter, the upper surface of the base body 1 including the silicone resin-coated area is subjected to a low temperature plasma treatment followed by coating with a primer composition to form a primer layer P on which a transparent top coating layer 9 is formed by coating with a urethane resin-based coating composition. The embodiment illustrated in FIG. 1C is similar to that illustrated in FIG. 1B but the light-shielding silicone resin layer 7, which is limited to the upper surface of the key top 2 only in FIG. 1B, extends to the whole upper surface of the base body 1.

Figure 2:
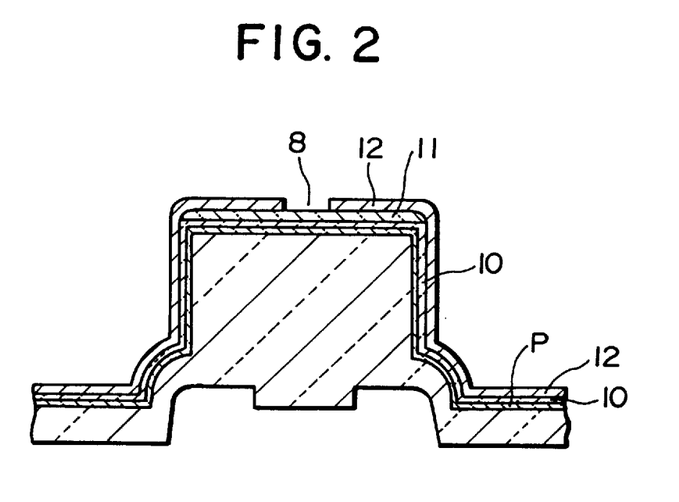
FIG. 2 is a schematic illustration of a vertical cross sectional view of an internally illuminable model of the inventive push button switch covering member.

The embodiment illustrated in FIG. 2 is also an internally illuminable push button switch covering member, of which the base body 1 shaped from a light-transmitting silicone rubber is first subjected to a low temperature plasma treatment followed by coating with a primer composition to form a primer layer P and then with a urethane resin-based coating composition to form a transparent urethane resin-based coating layer 10, referred to as a first urethane layer hereinafter, on allover the upper surface of the base body 1. Thereafter, a second urethane layer 11, which is colored but light-transmitting, is formed on the upper surface of the key top 2 only and a light-shielding top coating layer 12, which is a third urethane layer, is formed on allover the upper surface of the base body 1 leaving the area 8 corresponding to an indicia. It is preferable that coating to form the second urethane layer 11 is performed only after curing of the first urethane layer 10 and coating to form the third urethane layer 12 is performed only after curing of the second urethane layer 11 under the respective curing conditions. The adhesion between the first urethane layer 10 and the second urethane layer 11 or third urethane layer 12 as well as the adhesion between the second urethane layer 11 and the third urethane layer 12 is excellent even without undertaking any special means and regardless of the length of time between the coating steps by virtue of the good chemical affinity between the layers each of which is formed from a urethane resin-based coating composition. Each of the urethane resin-based coating layers should have a thickness which depends on the nature of the particular coating layer. For example, a light-shielding coating layer should preferably have a relatively large thickness in the range from 20 to 70 $\mu$m in order to ensure completeness of light shielding while the thickness of a light-transmitting coating layer can be relatively small to be in the range from 5 to 20 $\mu$m.

Figure 3:
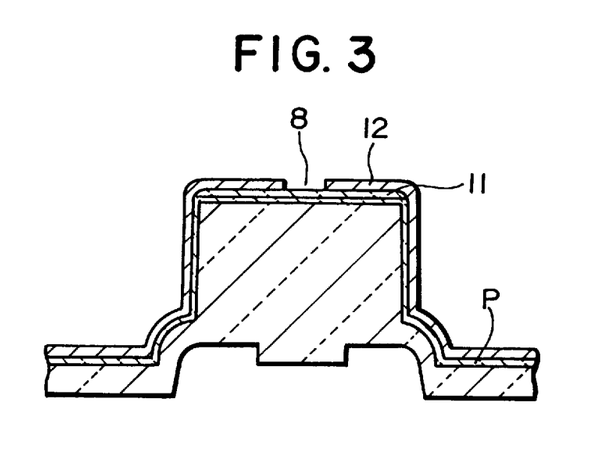
FIG. 3 is a schematic illustration of a vertical cross sectional view of another internally illuminable model of the inventive push button switch covering member.

The embodiment illustrated in FIG. 3 is about the same as that in FIG. 2 excepting omission of the first urethane resin-based coating layer 10 in FIG. 2. This embodiment is advantageous because the thickness of the coating layers on the riser part is so small that the resilience of the riser part which is essential to ensure quickness and reliableness of the push button switch operation is little influenced.

It is usual that a silicone rubber-made push button switch covering member is prepared by molding and shaping an uncured silicone rubber composition into the form of the covering member under compression with simultaneous primary curing by heating followed by a treatment of secondary curing or so-called post-curing. This secondary curing treatment has an effect to perfect curing of the rubber and to reduce the content of organosiloxane oligomers including, for example, cyclic tetramers to cyclic eicosamers of diorganosiloxane units, referred to as D4 and D20, respectively, which may affect the stability of the cured silicone rubber article and cause a trouble due to contamination of the electric contact points, to a reduced residual content, for example, not exceeding 300 ppm as a total of these oligomers. It has been unexpectedly discovered that the adhesive bonding strength of a urethane resin-based coating layer to the underlying layer of a cured silicone rubber is greatly influenced by the residual content of these organosiloxane oligomers even after the low temperature plasma treatment and the coating treatment with the primer composition. In particular, the residual content of the oligomers D4 to D20 in the cured silicone rubber article should be decreased not to exceed 3000 ppm or, preferably, not to exceed 2000 ppm since otherwise falling of the coating layer of the urethane resin-based coating composition may take place after repeated stretching and contraction of the rubber part. In this regard, it is preferable that the low temperature plasma treatment of a cured silicone rubber article should be preceded by a post-curing treatment at 180° to 220° C. for 30 to 120 minutes so that the residual content of the organosiloxane oligomers can be decreased to the above mentioned level at least in the surface layer of 1 mm thickness. It is of course that the thus post-cured silicone rubber article should be kept away from uncured silicone rubber compositions and from silicone rubber articles primarily cured but before the post-curing treatment in order to avoid absorption of any low-molecular oligomers emitted therefrom.

In the following, the present invention is described in more detail by way of Examples by making reference to the further figures in the accompanying drawing as preceded by a description of several preliminary tests.

PRELIMINARY TEST 1

With an object to make a choice of the formulation of of the urethane resin-based coating composition to be applied to the silicone rubber-made base body after a primer treatment, following experiment was undertaken. Thus, tolylene-2,4-diisocyanate as a polyisocyanate compound and a polyester polyol as a polyol compound were taken to give varied NCO/OH ratios without or with admixture of 1,1-bis(tert-butylperoxy)-3,5,5-trimethyl cyclohexane as a dialkyl peroxide in an amount up to 11.0 parts by weight per 100 parts by weight of the total amount of the polyisocyanate and polyol compounds together with a small amount of titanium dioxide as a pigment for coloration in white. The formulations of the respective compositions are shown in Table 1 below.

The evaluation of these urethane resin-based coating compositions was undertaken for the coating layers of 50 μm thickness after curing by heating at 150° C. for 60 minutes. The testing items included the adhesive bonding strength between the coating layer and the substrate surface by the checkerboard test according to the method specified in JIS K5400, Section 8.5.1, to record the results as Good and Poor when the point given to the sample was 5 or higher and lower than 5, respectively, and the strength of the coating layer against rubbing by a method in which the coating layer was repeatedly rubbed with a plastic eraser reciprocatingly moved back and forth over a stroke of 8 mm in a frequency of 120 reciprocations per minutes to record the results as Good when the substrate surface was not exposed bare after 20,000 reciprocations and as Poor when the substrate surface was exposed bare before 20,000 reciprocations as well as discoloration of and foaming or blistering in the coating layer.

TABLE 1

| Composition No. | NCO/OH ratio | Peroxide, parts by weight |
|---|---|---|
| 1 | 1.4 | 1.0 |
| 2 | 1.4 | 10.0 |
| 3 | 1.5 | 0 |
| 4 | 1.5 | 0.5 |
| 5 | 1.5 | 1.0 |
| 6 | 1.5 | 10.0 |
| 7 | 1.5 | 11.0 |
| 8 | 2.0 | 0.5 |
| 9 | 2.0 | 1.0 |
| 10 | 2.0 | 10.0 |
| 11 | 2.0 | 11.0 |
| 12 | 2.1 | 1.0 |
| 13 | 2.1 | 10.0 |

Discoloration of Coating Layers:

No discoloration was noted excepting for the Compositions No. 7 and No. 11 formulated with 11.0 parts by weight of the peroxide.

Foaming in Coating Layer:

No foaming was noted excepting for the Compositions No. 3, No. 4 and No. 8.

Adhesive Bonding Strength:

"Good" in each excepting for the Compositions No. 3, No. 4 and No. 8.

Strength of Coating Layer:

"Good" for the Compositions No. 5, No. 6, No. 9 and No. 10 but "Poor" for the rest.

The above given results of the evaluation tests led to a conclusion that the NCO/OH ratio in the urethane resin-based coating composition should be in the range from 1.5 to 2.0 and the amount of the peroxide formulated therein should be in the range from 1 to 10 parts by weight per 100 parts by weight of the total amount of the polyisocyanate and polyol compounds.

PRELIMINARY TEST 2

Figure 4:
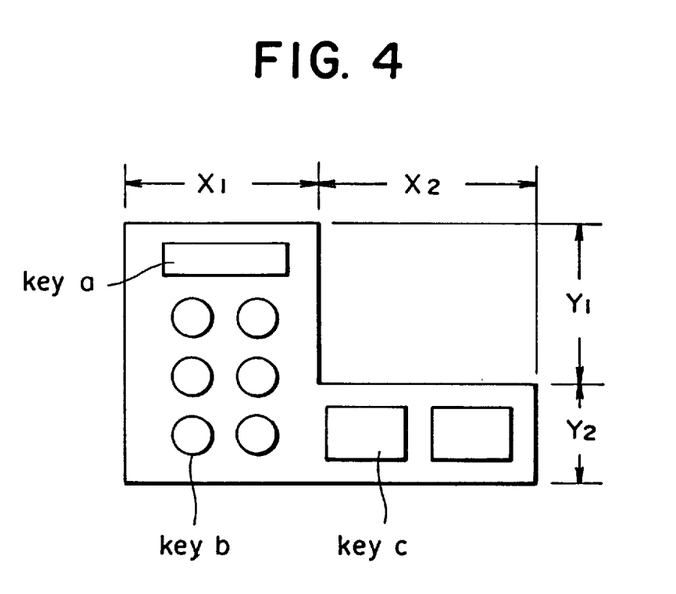
FIG. 4 is a plan view of a push button switch covering member as a test specimen used in the Preliminary Test 1.

A curable silicone rubber composition prepared by compounding 100 parts by weight of a commercial silicone rubber composition KE 9510U (commercial name, a product by Shin-Etsu Chemical Co.) and 2 parts by weight of a curing agent C8 (commercial name) containing 25% by weight of 2,5-dimethyl-2,5-bis(tert-butylperoxy) hexane and recommended by the company was shaped by compression molding at 175° C. for 2 minutes under a compressive force of 30 kgf/cm$^2$ to give an L-shaped push button switch covering member illustrated in FIG. 4 by a plan view. The dimensions given in the figure were: $X_1$=30 mm; $X_2$=35 mm; $Y_1$=27 mm; $Y_2$=15 mm; key top "a"=20 mm×5 mm×7 mm (height); key top "b"=6.5 mm diameter×9 mm (height); and key top "c"=13 mm×8 mm×12 mm (height). The wall thickness of the riser part in each of the key tops was 0.2 mm.

The thus prepared test specimens were subjected to a pre-treatment of the surface in a varied way followed by coating with a urethane resin-based coating composition (Fantascoat SF-6, a product by Origin Denki Co.) to form a coating layer thereon of which the adhesive bonding strength to the substrate surface was evaluated by the checkerboard test in the same manner as in Preliminary Test 1. The methods for the pre-treatment of the surface undertaken or considered included corona discharge treatment, flame treatment, ultraviolet irradiation treatment, electron beam irradiation treatment, surface roughening treatment with sand paper, chemical treatment, low temperature plasma treatment and primer treatment with an amino group-containing organosilane, of which none of the methods other than the latter two were found to be applicable due to one or more problems and disadvantages while the method of low temperature plasma treatment gave an adhesive bonding strength of rating 6 to be somewhat better than the primer treatment.

PRELIMINARY TEST 3

With an object to establish optimum conditions for the low temperature plasma treatment of the silicone rubber surface, a plasma treatment test was undertaken under varied conditions including the gaseous species selected from air, oxygen and mixture of oxygen and argon and varied length of the treatment time in the range from 0.25 minute to 240 minutes and the results were evaluated in terms of the adhesive bonding strength of the urethane resin-based coating layer determined by the checkerboard test. The results were that a mixture of oxygen and argon gave the highest adhesive bonding strength as the gaseous species of the plasma atmosphere and the strength was substantially identical for a length of the treatment time in the range from 0.5 minute to 60 minutes.

PRELIMINARY TEST 4

The test specimens of push button switch covering member prepared in Preliminary Test 2 were each coated, after the low temperature plasma treatment for 5 minutes in an atmosphere of a mixture of oxygen and argon under a pressure of 0.2 hPa, with a primer composition which was a mixture of an epoxy group-containing organosilane and an amino group-containing organosilane in a varied (epoxy:amino) molar ratio of 1:1.5, 1:2, 1:5 or 1:5.5 by moles dissolved in toluene or isopropyl alcohol followed by coating with a urethane resin-based coating composition and testing of various properties of the coating layers and testing of discoloration in and adhesive bonding strength of the coating layer either as prepared or after an accelerated aging at an elevated temperature of 65° C. for 240 hours or under high temperature-high humidity conditions of 65° C. and 95% relative humidity for 240 hours. Quite satisfactory results could be obtained when the above mentioned NCO/OH molar mixing proportion was 1:2 or 1:5. The results of testing were substantially identical for toluene and isopropyl alcohol as the solvent of the primer composition but toluene was preferred to isopropyl alcohol due to the about twice longer pot life of the solution before gelation.

PRELIMINARY TEST 5

Figure 5:
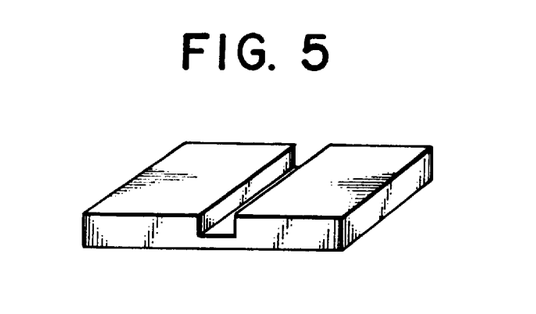
FIG. 5 is a perspective view of the test specimen used in the Preliminary Test 2.

Test pieces of the configuration illustrated in FIG. 5 by a perspective view were prepared by compression-molding of a commercial silicone rubber composition under varied conditions for the post-curing treatment. One of the two pieces a group of the test specimens prepared under the identical post-curing conditions was retained and subjected to the gas chromatographic analysis for the contents of the low molecular cyclic organosiloxane oligomers including the tetramer D4 to the eicosamer D20 and the other of the same group was subjected to the low temperature plasma treatment and coating with a primer composition in a thickness of 20 μm under the same conditions as in Example 1 described below followed by coating with a urethane resin-based coating composition admixed with an organic peroxide on the plasma-treated and primer-coated surface in a coating thickness of 60 μm followed by curing at 150° C. for 30 minutes.

The thus prepared test pieces were subjected to the 10 times repeated stretching and release test of the 1 mm thick and 5 mm by 20 mm wide thin-walled center portion to give an elongation of 200% in each time immediately followed by releasing to examine the condition of adhesion between the urethane resin-based coating layer and the substrate surface. The results of this test were that no lifting of the coating layer from the substrate surface was noted after 9 or 10 times repetition of the cycles of stretching and releasing when the total content of the organopolysiloxane oligomers was less than 2000 ppm while lifting of the coating layer was noted after 7 times or less of repetition of the cycles when the oligomer content exceeded 2000 ppm.

EXAMPLE 1

A light-transmitting base body of cured silicone rubber in the form of a push button switch covering member was prepared by compression-molding a silicone rubber composition prepared by uniformly blending 100 parts by weight of a commercial silicone rubber compound DY32-6014U (a product by Toray Dow Corning Co.) and 0.5 part by weight of a crosslinking agent RC-8 (a product by the company supra) under the conditions including a molding temperature of 180° C., molding time of 5 minutes and molding pressure of 180 kgf/cm². The base body was subjected to a low temperature plasma treatment on the upper surface under the conditions including: a flow rate of oxygen 60 ml/minute; pressure of atmosphere 0.3 hPa; high-frequency electric power output 300 watts; and treatment time 30 seconds.

The thus plasma-treated surface of the base body was coated by spraying with a primer solution prepared by dissolving 30 parts by weight of an amino group-containing organosilane compound (KBP-40, a product by Shin-Etsu Chemical Co.) and 15 parts by weight of an epoxy group-containing organosilane compound (KBM-403, a product by the company supra) in 55 parts by weight of toluene followed by evaporation of the solvent. The thus primer-coated surfaces of the key top parts of the base body were coated with a light-transmitting white urethane resin-based coating composition or a light-transmitting urethane resin-based coating composition colored in red or blue color each in a thickness of 15 μm followed by drying under heating at 80° C. for 30 minutes and then whole-surface coating with a light-shielding urethane resin-based coating composition admixed with an organic peroxide to form a coating layer of 40 μm thickness which was dried and cured by heating at 150° C. for 30 minutes.

The light-shielding coating layer on the areas of the key top parts was pattern-wise removed by working with a laser-beam engraver to form an indicia by exposing the underlying colored coating layer so as to complete a push button switch covering member of cured silicone rubber, which could give an excellently rigid and dry touch feeling to the operator's finger tip with good operability.

The coating layer of the urethane resin-based coating layer was subjected to the test of the strength by the eraser-rubbing method described in Preliminary Test 1 to find that the surface of the base body was not exposed bare even after 30,000 times reciprocations of rubbing. Further, as a simulation test for the resistance against greasy matter coming from the finger tip, the coated surface was kept in contact with a cotton cloth soaked with a ricinoleic acid ester for 240 hours in an atmosphere of 95% relative humidity at 65° C. and the hardness of the rubber surface was measured with a micro hardness tester to find a hardness of 79.5 and 79.0 before and after this ester-contacting test, respectively, to be quite satisfactory.

EXAMPLE 2

The same base body of a push button switch covering member as used in Example 1 was coated on the upper surface of the key top parts with a light-transmitting silicone resin-based coating composition colored in white, blue or red in a thickness of 15 μm followed by curing at 200° C. for 30 minutes and then coated on the whole upper surface of the base body with a light-shielding silicone resin-based coating composition followed by curing at 200° C. for 60 minutes. Thereafter, the light-shielding upper coating layer was removed pattern-wise with a laser beam engraver in the pattern of an indicia to expose bare the underlying light-transmitting colored coating layer.

The surface of the base body coated with the silicone resin-based coating compositions was subjected to a low temperature plasma treatment under substantially the same conditions as in Example 1 except that the plasma atmosphere was formed by passing 30 ml/minute of oxygen and 9 ml/minute of argon through the plasma chamber and the treatment time was extended to 120 seconds. The thus plasma-treated surface of the silicone resin-based coating layer was coated allover first with the same primer composition in the same manner as in Example 1 and then, after lapse of 30 minutes therefrom, with a clear urethane resin-based coating composition capable of giving a transparent coating layer with admixture of an organic peroxide followed by curing of the coating layer by heating at 150° C. for 40 minutes to complete a push button switch covering member.

The above prepared test specimen was subjected to the same evaluation tests as in Example 1 to find that the wear resistance against rubbing with the eraser was excellent without exposure of the underlying substrate surface after 30,000 times reciprocations of rubbing. Further, the hardness of the rubber surface was 78.0 and 77.5, respectively, before and after the contacting test with the ricinoleic acid ester.

COMPARATIVE EXAMPLE 1

The procedure for the preparation of a push button switch covering member was substantially the same as in Example 2 except that the test specimen was finished without undertaking the low temperature plasma treatment, the priming treatment and the coating treatment with the urethane resin-based coating composition to follow the formation of the indicia by the laser beam working.

The results of the evaluation tests for this test specimen were that the wear resistance against repeated rubbing was poor to cause exposure of the substrate surface after 1000 times reciprocations of rubbing. The hardness of the rubber surface was 60.0 and 45.5, respectively, before and after the contacting test with the ricinoleic acid ester. The surface of this covering member gave a touch feeling of tackiness to the operator's finger tip rather to decrease the working efficiency of switch operation.

EXAMPLE 3

The same base body of push button switch covering member as prepared in Example 1 was coated on the upper surface of the key top parts with a light-transmitting silicone resin-based coating composition in a coating thickness of 7.5 μm in the pattern of an indicia by the method of screen printing followed by curing of the coating layer by heating at 200° C. for 30 minutes. The surface of the thus formed coating layer was subjected to a low temperature plasma treatment in an atmosphere of 0.2 hPa pressure with a combined gas flow of 20 ml/minute of oxygen and 6 ml/minute of argon through the plasma chamber with a high-frequency power output of 200 watts for a length of time of 180 seconds.

The plasma-treated surface was then coated allover with the same primer composition as used in Example 1 immediately followed by coating with a clear urethane resin-based coating composition with admixture of an organic peroxide capable of giving a transparent coating layer and curing of the coating layer by heating at 135° C. for 60 minutes to complete an internally illuminable push button switch covering member.

The results of the evaluation tests of this test specimen were that the touch feeling to the finger tip of an operator was excellently dry and untacky and the wear resistance against rubbing was also excellent without exposure of the underlying surface even after 2000 times reciprocations of rubbing with the eraser.

COMPARATIVE EXAMPLE 2

The same base body of push button switch covering member as prepared in Example 1 was coated on the upper surface of the key top parts with a light-transmitting silicone resin-based coating composition in a coating thickness of 7.5 μm in the pattern of an indicia by the method of screen printing followed by curing of the coating layer by heating at 200° C. for 30 minutes.

The results of the evaluation tests of this test specimen were that the wear resistance against rubbing was poor to cause exposure of the underlying surface after only 300 times reciprocations of rubbing with the eraser.

What is claimed is:

1. A cured silicone rubber article having a protective coating layer which comprises:
   (a) a substrate having a surface layer formed from a cured silicone rubber or silicone resin having a surface after treatment with gas plasma;
   (b) an intermediate layer on the surface layer of the substrate formed from a primer composition which is a blend of an epoxy group-containing organosilane compound and an amino group-containing organosilane compound in a molar proportion in the range from 1:2 to 1:5; and
   (c) a top layer of a cured urethane resin-based coating composition on the layer of the primer composition.

2. The cured silicone rubber article having a protective coating layer as claimed in claim 1 in which the epoxy group-containing organosilane compound is represented by the general formula $$X\text{-}A\text{-}Si(CH_3)_{3-m}(OR)_m,$$

in which R is a methyl group or ethyl group, the subscript m is a number of 1, 2 or 3, A is a divalent hydrocarbon group and X is a monovalent organic group having an epoxy group.

3. The cured silicone rubber article having a protective coating layer as claimed in claim 1 in which the amino group-containing organosilane compound is represented by the general formula $$Y\text{-}A\text{-}Si(CH_3)_{3-n}(OR)_n,$$

respectively, in which R is a methyl group or ethyl group, the subscripts n is a number of 1, 2 or 3, A is a divalent hydrocarbon group and Y is a monovalent organic group having an amino group.

4. The cured silicone rubber article having a protective coating layer as claimed in claim 1 in which the coating amount of the intermediate layer of the primer composition is in the range from 1 to 50 g/m$^2$.

5. A method for the preparation of a cured silicone rubber article having a protective coating layer which comprises the steps of:
   (1) subjecting a surface of a cured body of a silicone rubber to a treatment with gas plasma;
   (2) coating the plasma-treated surface of the silicone rubber article with a primer composition which is a blend of an epoxy group-containing organosilane compound and an amino group-containing organosilane compound in a molar proportion in the range from 1:2 to 1:5 to form an intermediate primer layer;
   (3) coating the intermediate layer of the primer composition with a urethane resin-based coating composition consisting of a polyisocyanate compound and a polyol compound and containing 1 to 10% by weight of an dialkyl peroxide based on the total amount of the polyisocyanate compound and the polyol compound; and (4) heating the thus coated silicone rubber article to effect curing of the urethane resin-based coating composition.

6. The method for the preparation of a cured silicone rubber article having a protective coating layer as claimed in claim 5 in which coating of the plasma-treated surface with a primer composition is performed within 1 hour from completion of the low temperature plasma treatment.

7. The method for the preparation of a cured silicone rubber article having a protective coating layer as claimed in claim 5 in which step (1) is preceded by heating of the cured body of a silicone rubber so as to decrease the content of organosiloxane oligomers not to exceed 3000 ppm by weight.

8. The method of claim 7 wherein the oligomers are D4 to D20 oligomers.

9. The method for the preparation of a cured silicone rubber article having a protective coating layer as claimed in claim 5 in which the epoxy group-containing organosilane compound is represented by the general formula $$X\text{-}A\text{-}Si(CH_3)_{3-m}(OR)_m,$$

in which R is a methyl group or ethyl group, the subscript m is a number of 1, 2 or 3, A is a divalent hydrocarbon group and X is a monovalent organic group having an epoxy group.

10. The method for the preparation of a cured silicone rubber article having a protective coating layer as claimed in claim 5 in which the amino group-containing organosilane compound is represented by the general formula $$Y\text{-}A\text{-}Si(CH_3)_{3-n}(OR)_n,$$

respectively, in which R is a methyl group or ethyl group, the subscripts n is a number of 1, 2 or 3, A is a divalent hydrocarbon group and Y is a monovalent organic group having an amino group.

11. The method for the preparation of a cured silicone rubber article having a protective coating layer as claimed in claim 5 in which the coating amount with the primer composition in step (2) is in the range from 1 to 50 g/m².

12. A silicone rubber-made push button switch covering member which comprises:

(A) a base body of a cured silicone rubber having a surface layer formed from a cured silicone rubber or silicone resin, having a configuration integrally consisting of
i) a base place,
ii) at least one key top plate above the base plate, and
iii) at least one riser part connecting the base plate and the key top plate to form a dome-like protrusion rising above the base plate
a surface of the base body having been treated with gas plasma;

(B) an intermediate layer on the key top plate formed from a primer composition which is blend of an epoxy group-containing organosilane compound and an amino group-containing organosilane compound in a molar proportion in the range from 1:2 to 1:5; and (C) a top layer of a urethane resin-based coating composition on the intermediate layer of the primer composition.

* * * * *